June 5, 1934.  F. C. MOCK  1,961,861
SHOCK ABSORBER
Filed July 1, 1927    4 Sheets-Sheet 2

Inventor
Frank C. Mock
By Brown, Boettcher & Dienner
Atty's.

June 5, 1934.  F. C. MOCK  1,961,861
SHOCK ABSORBER
Filed July 1, 1927  4 Sheets-Sheet 3

Inventor
Frank C. Mock
By Brown, Boettcher & Diener
Attys

June 5, 1934.  F. C. MOCK  1,961,861
SHOCK ABSORBER
Filed July 1, 1927   4 Sheets-Sheet 4

INVENTOR.
Frank C. Mock
BY
ATTORNEY.

Patented June 5, 1934

1,961,861

UNITED STATES PATENT OFFICE 1,961,861

SHOCK ABSORBER

Frank C. Mock, Chicago, Ill., assignor, by mesne assignments, to Bendix Stromberg Carburetor Company, South Bend, Ind., a corporation of Illinois Application July 1, 1927, Serial No. 202,779

14 Claims. (Cl. 267—10)

My invention relates to spring controllers for motor vehicles and the like. These devices are popularly known as shock absorbers.

Spring controllers are applied to vehicles to dissipate, in the form of heat, the energy absorbed by the vehicle springs. When the spring is compressed by the inertia of the body, it tends to recoil and thereby to do work in the form of throwing the weight of the body above the position corresponding to normal for the given load. The controller is intended to convert the energy acquired by the spring into heat in order to let the spring assume its normal position.

The body of the vehicle is always subjected to the force of gravity acting downwardly and to the force of the spring acting upwardly, and these forces are normally balanced and the body stands still relative to the axle.

If the vehicle starts to move in a horizontal direction strictly normal to the line of action of gravity, that is, the vertical, this relative balance is not disturbed. If, however, the vehicle, or any part of the same, departs from a strictly horizontal path, the force of inertia comes into play to disturb this equilibrium, such deviations from horizontal being caused by road inequalities, that is, changes in road contour from a straight line. We are not at present interested in the deviations from a straight line in turning laterally.

The force of inertia caused by road inequalities may be surprisingly great. I have shown, for example, in my paper "Dynamics of Vehicle Spring Suspension" in the Journal of the Society of Automotive Engineers for July, 1925, that the force of inertia developed by a bump of two inches rise, in two feet, with the vehicle traveling thirty miles per hour, is about five times gravity. That force tends to compress the springs, and as soon as it becomes less than the force of the spring acting upwardly the recoil of the spring will occur. The energy of recoil should be dissipated in work, and controllers of the prior art have attempted to do so.

I have observed, however, that within the prior art they are incapable of proper differentiation of when to check spring expansion and when not to do so. Not all separations of the body and axle should be opposed, as I shall presently show. For example, assume a depression in the road. The axle should be free to drop down and receive support from the road without pulling the body down with it. Attempts have been made to release the controller for downward movement of the axle for all movements below normal neutral position with respect to the body. But this is not a true criterion as will be seen later.

I have discovered that the true criterion of the necessity for control of recoil of the springs resides in the acceleration, positive and negative of the axle in a vertical direction, and I have provided a novel method of and means for applying the friction of the controller to the springs under the control of a device which is sensitive to or measures the acceleration of the axle.

Now, in order to acquaint those skilled in the art with the manner of constructing and operating a device embodying my invention, I shall describe in connection with the accompanying drawings first the necessity for the action which I have described, and then a specific embodiment of my invention.

In the drawings Figs. 1 to 5 are diagrams of road profiles and the actions involved in the spring suspension of the vehicle in encountering such profiles;

Figure 1:
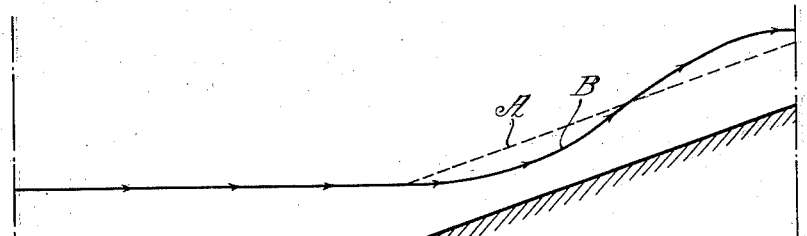
Figure 2:
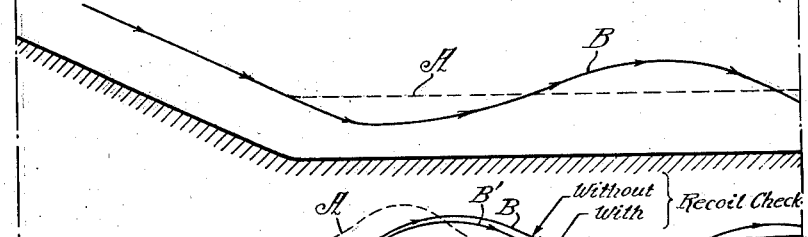

Referring now to the diagrams on Sheet 1, Fig. 1 shows a road profile sometimes encountered at the approach to bridges, railroad crossings and the like, consisting of a fairly abrupt change from horizontal to an upward inclination. As the wheels strike the incline, the frame will approach the axle until the body has assumed a direction parallel to the incline, when recoil of the spring will occur. At this time the frame and axle are close together, the axle has received acceleration upward and the recoil check action is desired. In these diagrams, the dotted line parallel to the line of the road profile is the travel of the axle. The solid line is the travel of the body, that is, the center of gravity of the body.

Figure 3:
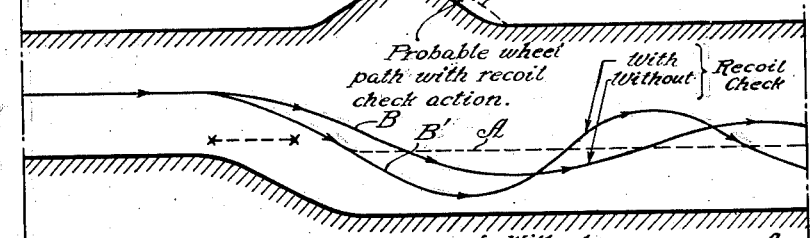

Fig. 3 shows a horizontal road profile with an abrupt bump or rise in it followed by a quick return to the horizontal path. In this case the axle will rise to approach the frame as long as the road profile slopes upwardly, but the moment the upward slope has been passed, compression of the vehicle spring will cease to increase and recoil will occur. In this case the smoothest action will be obtained if the recoil is unchecked so that the wheel can follow the road profile while continuing to support the body. It can be seen that if there were no spring recoil the wheel would leave the road and travel in a parabola until it struck the ground again. Here we have a condition where the frame is near the axle, the road profile slopes downwardly, and no recoil check action is desired. More specifically, recoil check action should be eliminated between points $x$—$x$ where the axle must be accelerated downwardly to follow the road.

Figure 4:
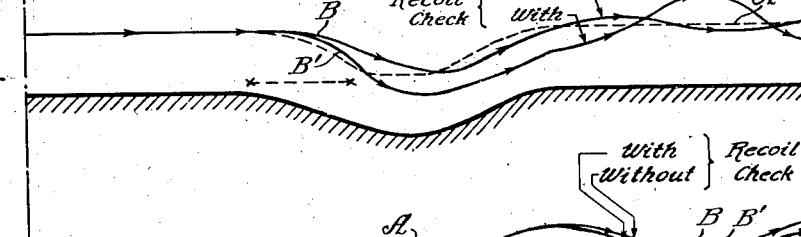

Fig. 4 illustrates two road profiles the upper of which begins horizontally, then turns downward and then continues horizontal. In the lower half of Fig. 4 the profile turns upward before returning to the horizontal. In this diagram, as in the previous one, the path of the axle is shown by the dotted line A, the path of the center of gravity of the body without recoil checks is indicated at B, and the path of the center of gravity with recoil checks is indicated at B'. It will be observed that the acceleration of the body downward during its passage over the downwardly inclined road profile is less when no recoil check is used, with the result that the body velocity downward is less when the change of road profile to the horizontal is encountered, and therefore the shock and spring compression are less. In these instances we have normal distance from frame to axle, a downward turn in the road profile and no recoil check action is desired. This again specifically relates to the part of the path indicated by the dotted line $x$—$x$.

Figure 5:
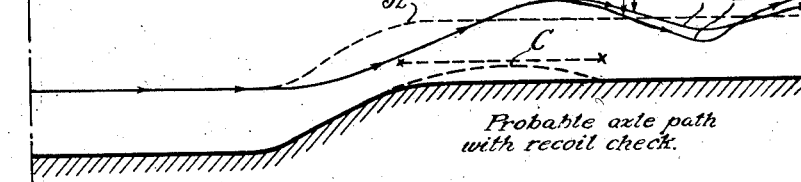

Fig. 5 shows a road profile beginning horizontally with an upward turn followed by a return to a normal horizontal path. During the upward turn the frame will approach the axle and when the horizontal grade begins recoil check action is not desirable, as it will have a tendency only to make the wheels leave the road and describe a parabolic curve the same as considered in connection with Fig. 3. Here we have the frame near the axle, the profile turning downward, and no recoil check action is desired, particularly along the part of the path indicated by the dotted line $x$—$x$.

From the above simple analysis it will be possible to deduce that the recoil check must not offer resistance to yield of the axle towards the frame, as this will simply stiffen the spring action. It must not continuously tie the spring down, that is, tie the axle to the frame, or it will keep the vehicle spring under an initial tension in excess of that of the weight upon it, and the spring will not yield under small bumps. The recoil check should permit the axle to follow freely into dips in the road because the upward jolt on the far side of the dip is much stronger when the axle and frame are tied together so that the body and axle fall into the dip, and if the spring is free so that the axle can follow into the dip while the spring is still supporting the main part of the weight of the body. At certain times, it is therefore desired to have the recoil check resist separation of the axle and frame and at other times such separation should be unretarded. Attempts have been made to get proper regulation according to the relative position of the axle and frame and according to their velocity of separation, but such regulations do not go to the root of the matter, as will be apparent from the foregoing diagrams. I have conceived the desirability of getting the required regulation by a device operating according to the contour of the road surface, according to the extent and rate at which this departs from a continuous direction, or in other words, according to how much the axle accelerates upward or downward relative to the vehicle frame.

From the foregoing diagrams it can be seen that on practically all of the simple road inequalities encountered recoil check action is desired when the road profile turns upward, and no recoil check action is desired when the road profile turns downward.

According to my invention, I mount the controlling element for the shock absorber on the axle, as this is the part of the vehicle the upward and downward acceleration of which responds most closely to the profile of the road, much more so than any part of the vehicle that is supported on the springs. In the preferred form of the invention I place the recoil check on the axle and provide it with an element responsive to upward and downward accelerations, operating in such a way as to decrease the force of operation of the recoil check during and according to the downward acceleration of the device.

Figure 6:
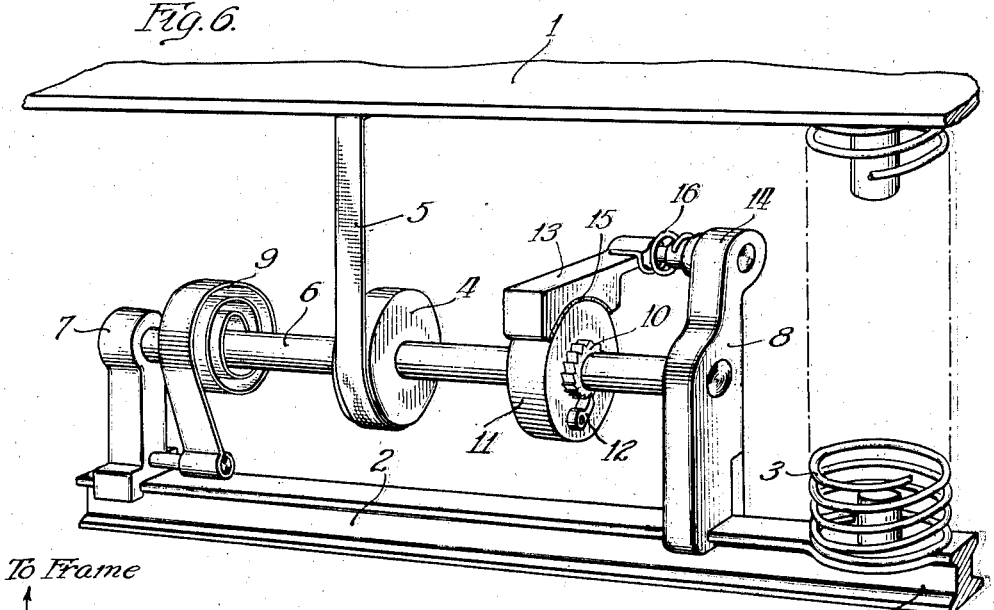
Fig. 6 is a simplified structure illustrating the action involved in the controller of my invention.

In Fig. 6 I have illustrated, more or less diagrammatically, and in a simplified form, a means for securing the desired result.

The body of the vehicle is shown at 1 and the axle at 2. The axle is supported on wheels which follow the road profile and the axle 2, in turn, supports the body 1 through a spring 3, which in this case is shown as coil spring for the sake of simplicity.

Upon the axle 2 I mount a take-up drum element 4 connected by a flexible strap 5 to the body 1. This drum 4 is keyed to a shaft 6 having trunnions at 7 and 8 on the axle 2. A take-up spiral spring 9 tends to take up the slack in the strap 5 when the body 1 approaches the axle 2. The shaft 6 has a ratchet 10 fixed thereto adjacent the friction drum 11, and the friction drum is rotatably mounted on shaft 6 and has a spring pressed pawl 12 adapted to engage the ratchet 10 upon separation of the body and axle which produces clockwise motion of the shaft 6, as viewed from the right hand end of the shaft. An inertia member or weight 13 is pivoted on the bracket 14 and it has a shoe 15 which engages the friction drum 11. A spring 16, which may be adjusted to a suitable tension applies pressure between the shoe 15 and the base of the drum 11 in addition to the weight of the member 13.

The operation of this device is as follows:—

Assume that the vehicle travels the road profile shown in the upper half of Fig. 4. As soon as the axle begins to travel downward it is accelerated under the influence of two forces, one of which is the force of gravity which operates equally on the body, on the mass 13 and on the axle. The second force is the expansive force of the main vehicle spring 3. Since the axle mass is only about one-eighth to one-tenth that of the car resting upon it, the axle can be moved downwardly more rapidly under the influence of these two forces than can the body be moved upwardly under equal force. The result of the downward movement of the axle and expansion of the spring, is to drop out the support from under the body and it begins to fall. Obviously, it is desirable that the axle be free to drop down so as to gain at all times the support of the road bed, and this can be secured by throwing off the friction of the spring controller during such descent of the axle.

It will be seen that the device shown in Fig. 6 will perform this required function of releasing the pressure of the shoe 15 upon drum 11 when the axle, with its connected parts, is accelerated downwardly.

This acceleration downwardly to release pressure gives the desired effect which is independent of the position of the parts, that is, the amount of compression or expansion of the springs, and independent of the load upon the vehicle.

When the wheel strikes the level portion at the base of the incline shown in the upper half of Figure 4, downward movement of the axle ceases, but the falling of the body to regain its support from the spring continues until the momentum of the body has expended its force in compressing the spring, whereupon the spring begins to recoil, and at this time the friction of the controller (which is actuated solely by gravity since it is not subject to any other force of acceleration in either direction) acts to dissipate the energy which the spring has absorbed.

Thus I have provided a device which is responsive to vertical acceleration of the axle and is operative to oppose expansion of the spring under conditions which would otherwise produce excessive rebound, while under other conditions the device opposes no resistance to relative movement between the frame and axle.

Figure 11:
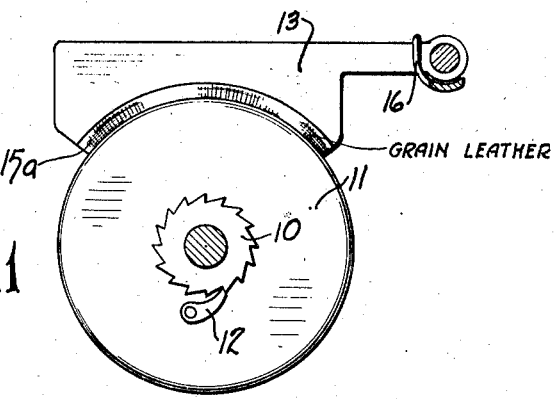
Figure 11 is a detail view showing a modified form of the friction members of Figure 6.

As a further feature of the device shown in Fig. 6, I may provide velocity control of the coefficient of friction between the shoe 15 and the drum 11. This is secured by making the drum 11 of plain, smooth metal and the shoe 15 the grain side of leather as indicated in Figure 11. It is known that leather and metal provide a friction, the coefficient of which increases with velocity.

Figure 7:
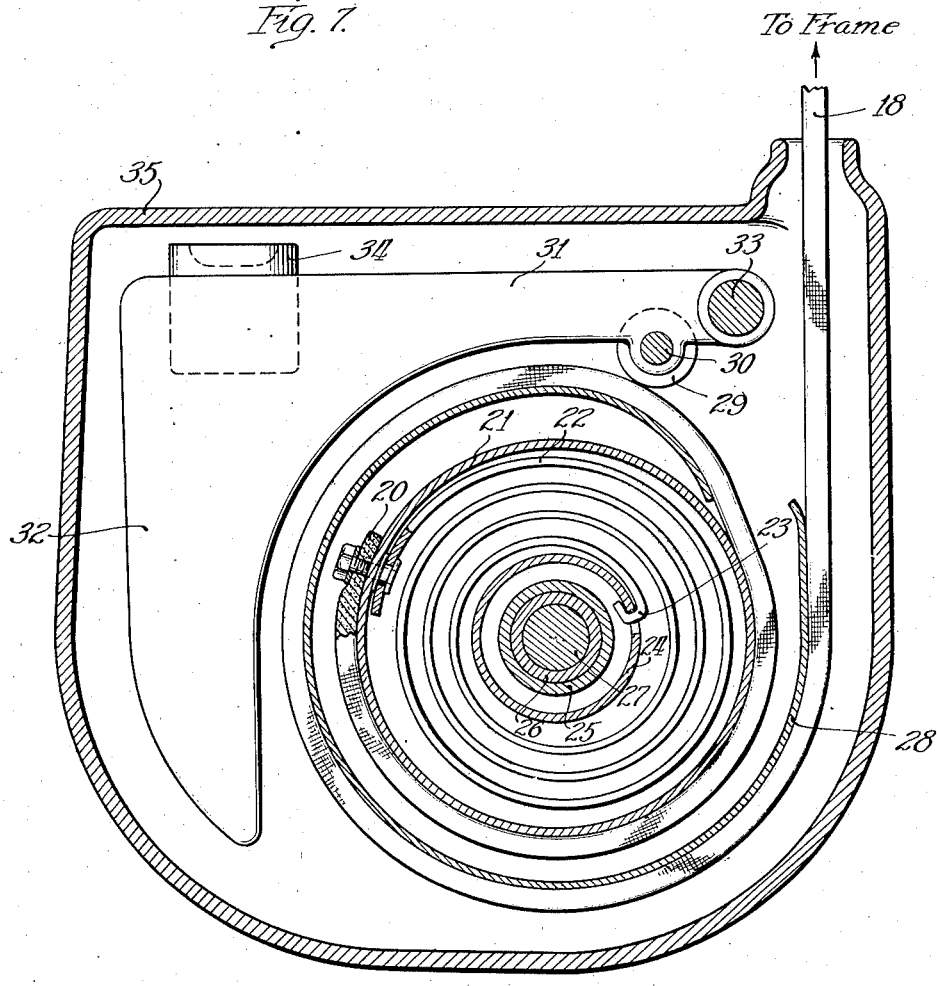
Fig. 7 is a vertical section through a strap type of controller embodying my invention.
Figure 9:
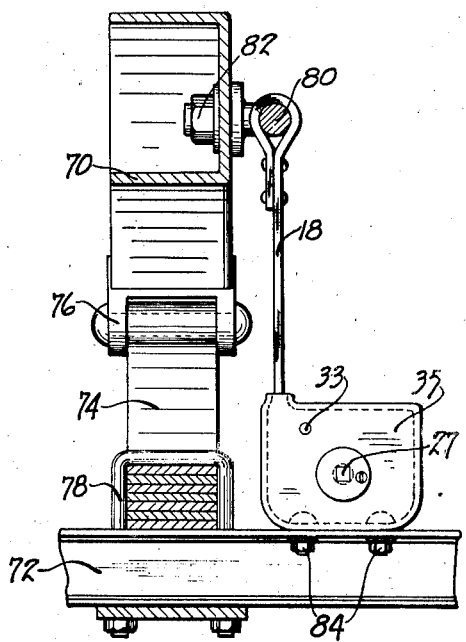
Figure 9 is a vertical elevation, partly in section, showing the controller of Figure 7 mounted upon an automobile.

In Figs. 7 and 9 I have shown an embodiment of my invention in which a strap member 18 is connected at its upper end to the frame and at its lower end 20 is connected to a retrieving drum 21. Between the vehicle axle 72 and frame 70 extends a leaf spring 74 which is secured to the frame at 76 and to the axle by means of a clamp 78 of usual construction. A U-bolt 80 is secured to the frame by nuts 82, one of which is shown in Figure 9, and receives the upper looped end of strap 18. This retrieving drum is provided with a retrieving spring 22, the inner end of which is hooked as indicated at 23, into a spring anchor 24. The drum 21 is provided with a suitable bearing sleeve 25 lined with an antifriction bearing 26 mounted upon a stationary pin 27.

The strap 18 is trained over the peripheral surface of a stationary drum member 28 so as to secure the cumulative or snubbing effect of the wrapping of said strap 18 upon said drum 28. Adjacent the tail end of the drum 28 I provide a pressure applying roller 29 pivoted at 30 on a movable arm 31 having a relatively large mass 32 at its outer end and swinging about the pivot 33. A rubber bumper 34 is mounted near the outer end of the arm 31, and this bumper is adapted to engage the top of the enclosing casing 35 when the entire device is accelerated downward under the action of gravity and the expansion of the vehicle spring. The casing 35 is, in turn, bolted upon the axle 72 by nuts 84, and this casing forms the support for the pivot pin 33 and the trunnion 27 for the retrieving spring, and also supports the friction drum or track 28.

Whereas, in Fig 6 I have shown a ratchet for connecting the shaft 6 to the drum 11 only upon the expansive movement of the vehicle spring 3, the device shown in Figs. 7 and 9 has somewhat the same general effect in that, upon approach of the frame towards the axle, the strap 18 is released from pressure against the drum 28 and, hence, only the immediate friction under the roller 29 needs to be overcome by the retrieving spring 32.

The weight of the mass 32 is the force which normally applies friction to the end of the strap 18 so as to secure a compound or snubbing effect.

It will also be apparent that in Fig. 6 the spring 16 may be omitted and solely the weight of the mass 13 relied upon for applying the friction to the drum 11.

Under normal horizontal travel of the device shown in Figs. 7 and 9, with only slight displacement the strap 18 will be under the tension of the spring 22. As soon as a downward turn in the road profile is encountered, the axle will accelerate downward, as its weight is only about one-eighth to one-tenth of the car weight resting upon it, but the weight 32 will tend to keep its previous position, since it is not rigidly connected to the axle and, therefore, is not accelerated by the main vehicle spring and thereby will remove most of the frictional effect of the device. On acceleration of the axle upward, this will of course increase the pressure of the roller 29, but it will not increase the frictional effect appreciably because the strap is, at this time, moving in the other direction and there is no cumulative wrapping effect on the strap 18 about the track 28.

It should be borne in mind that the forces of acceleration due to the road surface are quite large, as compared with gravity, under speeds normally encountered in automobile travel. For instance, the acceleration due to a rise of two inches in two feet traveling 30 miles per hour will be 323 feet per second per second, or about ten times that of gravity. It is interesting to contrast this with the rate of recoil of a vehicle spring. About the quickest acting springs with which I am familiar, have a frequency of approximately 180 per minute, so that one oscillation would, at this car speed, occupy about 14 feet of forward travel. The accelerations of body and frame during spring recoil are, therefore, very much less than those experienced by the axle as it passes over inequalities of road profile.

Figure 8:
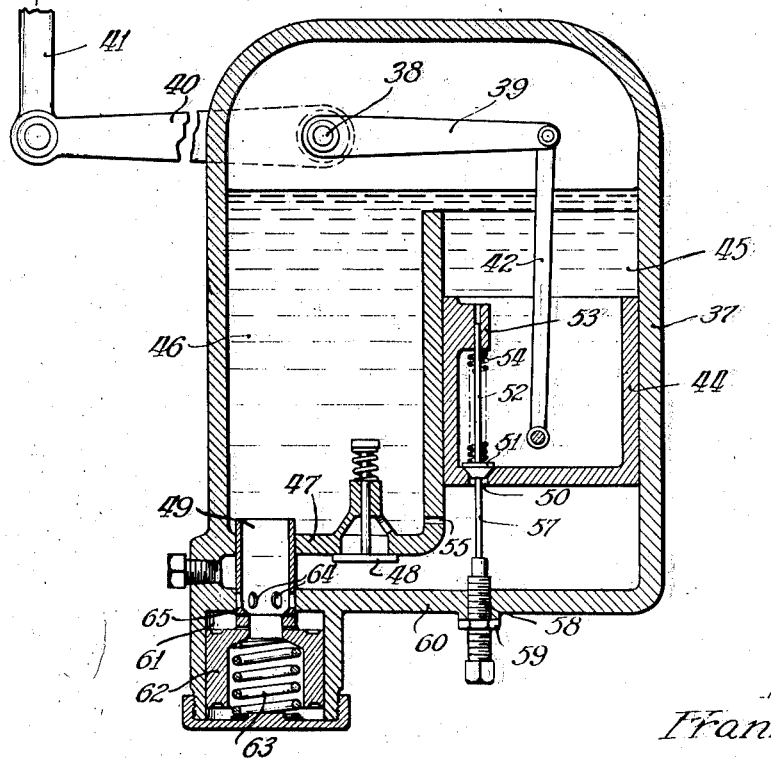
Fig. 8 is a like vertical section through a hydraulic controller embodying my invention.
Figure 10:
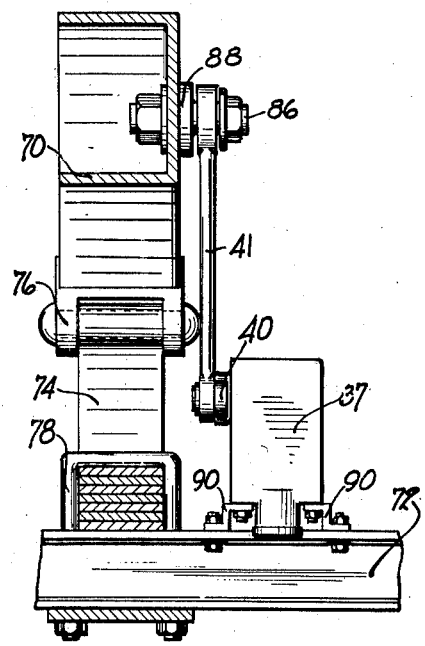
Figure 10 is a like view of the controller shown in Figure 8.

In Figs. 8 and 10 I have shown a form of hydraulic shock absorber embodying the present invention, in which there is a main casing 37 supporting at its upper end a transverse rock shaft 38 to which is connected an inner arm 39 and an outer arm 40. The outer arm 40 is connected by a link 41, a pin 86, and bracket 88 to the frame 70 of the vehicle. The inner arm 39 is connected by a link or rod 42 to the movable piston 44 which is fitted to play within the cylinder 45 formed in the interior of the casing 37. The cylinder 45 at its upper end is open into the interior of the casing and the space outside of the cylinder, as indicated at 46, constitutes a reservoir or overflow. A generally horizontal wall 47 provides a passageway from the cylinder 45 below the piston 44 leading to the check valve 48 and a control valve 49. The check valve 48 is spring loaded to close it normally and to permit it to open upon upward movement of the piston 44 to permit liquid, preferably oil, a glycerine solution or the like to enter the cylinder from the storage space 46.

The head of the piston 44 has a release port 50 controlled by a valve 51, the stem 52 of which is suitably guided in a guide 53 carried by the piston 44, and a spring 54 holds the valve 51 over the release port 50 under a predetermined tension.

The pressure of the spring 54 is great enough to hold the valve 51 closed for all normal pressures within the cylinder, but said valve 51 will release liquid and permit it to flow past the piston 44 upon the occurrence of abnormal pressures.

A leakage port 55 from the cylinder to the overflow 46 is also provided to permit free movement of the piston 44 for small or low velocity movement.

The valve 51 may be opened under positional control of an adjustable stop member 57 consisting of a rod adapted to be engaged by the valve 51 upon downward travel of the piston 44. This stop 57 is provided with an adjustable stem 58 threading through an opening in the bottom wall of the casing 37 and held in position by a lock nut 59.

This feature of the adjustable stop may, if desired, be dispensed with, since the control valve 49 performs the required function more perfectly.

The control valve 49 comprises a sleeve fitted into apertures in the wall 47 and in the bottom wall 60 of the casing 37. A well or chamber 61 is formed below said wall 60 and a weight 62 guided in said chamber 61 is connected to the lower end of the sleeve 49. The weight 62 is supported upon a spring 63. The chamber 61 communicates through the sleeve 49 with the overflow chamber 46. The spring 63 supports the sleeve in such a position that the valve openings 64, which are formed through the side walls of the sleeve 49, lie within the aperture in the lower wall 60.

Hence, no communication normally is afforded between the interior of the cylinder 45 below the piston 44 and the overflow chamber 46, except through the release port 50 and the leakage passageway 55.

The casing 37 is mounted upon the axle 72 of the vehicle by means of brackets 90 preferably bolted to the axle, as shown in Figure 10, and the outer arm 40 is connected through the link 41 to the frame 70 as above explained. If, now, the axle is accelerated downwardly under the influence of the spring and gravity, the weight 62 being acted on under the influence of gravity only, will lag behind the axle and will open the sleeve valve 49, permitting the piston 44 to move down freely when said valve is wide open.

If desired, the fit of the weight 62 in the chamber may be such as to secure a slight dash pot action to delay slightly the response of the valve 49 to the force tending to open or close it.

The release valve 51 may be controlled in any suitable manner, as disclosed in Mock Patent No. 1,690,546, issued November 6, 1928.

An additional release port controlled by a tapered pin, as disclosed in said patent, may be employed for giving a resistance proportional to the position of the piston 44.

Preferably, release ports 65 are provided for permitting escape of the oil trapped above the weight 62 in the chamber 61.

I do not intend to be limited to the details shown and described.

I am aware that it has been proposed to provide a control of the inertia type on shock absorbers in which the inertia element is mounted upon the frame or body of the vehicle, but, as I have pointed out above, such control is incorrect in theory and inadequate in practice.

I claim:—

1. In combination, a vehicle frame, an axle, a spring connecting the frame and the axle, and a spring rebound controller having means partaking of the motion of the axle for increasing the effective resistance of said controller to separation of the frame and axle in accordance with upward acceleration of the axle, said controller presenting substantially zero resistance to relative approach of axle and frame with respect to each other.

2. In combination, a body, a supporting spring therefor, an axle for the spring, a spring rebound controller comprising two friction members, one partaking of the motion of the body and the other partaking of the motion of the axle, and means responsive to acceleration of the axle downwardly, but independent of acceleration of the vehicle body downwardly for decreasing the friction exerted between said members, said spring controller presenting substantially no resistance to relative approach of axle and frame with respect to each other.

3. A spring controller comprising the combination with an axle and a frame, of a housing mounted on the axle, a stationary member within the housing and providing a friction surface, a flexible member having one end secured to the frame and the other end received within the housing and in operative engagement with the above mentioned surface, means to keep the flexible member taut, and inertia means responsive to upward acceleration of the axle to increase the friction between said surface and said member with increase in upward acceleration of the axle.

4. A method of controlling the action of a vehicle spring connected between the body and axle of a vehicle, comprising opposing separating movement of the body and axle with a retarding force varying inversely with the downward acceleration of the axle during such separating movement, and reducing the retarding force substantially to zero during approach of the axle and frame relative to each other.

5. A controller for a spring connected between the body and axle of a vehicle, comprising friction means resisting separating movements only of the axle and chassis, and means sensitive to downward acceleration of the axle for controlling the frictional resistance of the friction means.

6. In a spring rebound controller for an automobile, the combination of two relatively movable parts having means for interposing frictional resistance to their relative motion, corresponding to separation of the frame and axle, and means operative to increase the frictional resistance to movement of said parts with upward acceleration of the axle.

7. In combination with a vehicle body, an axle, and a vehicle spring between the body and axle; a recoil controller for the spring comprising two friction elements adapted to have relative motion upon separation of the body from the axle, a weight supported by the axle but adapted to have motion relative thereto, and means controlled by the weight for increasing the resistance to motion between said friction elements but becoming less effective upon downward acceleration of the axle.

8. In a system of the class described, an axle, a frame, a spring connecting them, and a spring controller including means affording resistance to separation of axle and frame which decreases with increase of downward acceleration of the axle, said controller affording substantially no resistance to approach of the axle and frame toward each other.

9. In a system of the class described, an axle, a frame, a spring connecting them, and a spring controller including means affording substantially no resistance to approach of the axle and frame toward each other by affording a resistance to separation of axle and frame which decreases with increase of downward acceleration of the axle and increases with increase in the velocity of separation of the axle and frame.

10. In combination, a vehicle having an axle and frame, a spring connecting them, and a spring rebound controller operative to oppose separation of the axle and frame and to allow unrestricted approach of the axle relative to the frame and comprising means including an inertia member carried by the axle and movable relative thereto for increasing the resistance of the rebound controller to separation of the frame and axle with upward acceleration of the axle and for decreasing the resistance of the rebound controller to the separation of frame and axle with downward acceleration of the axle.

11. In combination with a vehicle having a frame, an axle, and a spring connecting them; a fluid chamber comprising a movable wall, connections between the fluid chamber and movable wall and the axle and frame to cause the movable wall to decrease the volume of the fluid chamber upon movement of the frame and axle away from each other, a valve controlling the escape of fluid from said chamber, and an inertia member carried by the axle and movable relative thereto for opening said valve upon downward acceleration of the axle and maintaining said valve closed during upward acceleration of the axle.

12. In combination with a vehicle having a frame, an axle, and a spring connecting them; a chamber comprising a movable wall, liquid in said chamber, connections between the chamber and movable wall and the axle and frame to cause the movable wall to decrease the volume of the chamber upon movement of the frame and axle away from each other, a passage for the escape of liquid from said chamber, and an inertia member carried by the axle and movable relative thereto and operative to open said passage upon downward acceleration of the axle and to maintain said passage substantially closed during upward acceleration of the axle.

13. In combination with a vehicle having a frame, an axle, and a yielding member connecting them; a fluid container comprising a pressure compartment and a relief compartment, said pressure compartment having a movable wall, connections between the container and movable wall and the axle and frame to cause the movable wall to decrease the volume of the pressure compartment upon movement of the frame and axle away from each other, a passage for the escape of fluid from the pressure compartment to the relief compartment, and an inertia member carried by the axle and movable relative thereto and operative to open said passage upon downward acceleration of the axle and to restrict said passage upon upward acceleration of the axle.

14. In combination with a system comprising a shock receiving member, a member associated therewith, and a supporting spring interconnecting the members; a fluid container comprising a pressure compartment and a relief compartment having a movable wall, connections between the container and movable wall and said members to cause the movable wall to decrease the volume of the pressure compartment upon movement of said members away from each other, a passage for the escape of fluid from the pressure compartment to the relief compartment, an inertia member carried by the shock receiving member and movable relative thereto and operative to open said passage upon downward acceleration of the shock receiving member and to restrict said passage upon upward acceleration of the shock receiving member, and a valved passage permitting flow of fluid from the relief compartment to the pressure compartment.

FRANK C. MOCK.